United States Patent [19]

Swasey

[11] 3,734,816
[45] May 22, 1973

[54] LAMINATED STRUCTURE HAVING A RENEWABLE TACKY SURFACE

[76] Inventor: Joyce A. Swasey, Rutland Street, Carlisle, Mass. 01741

[22] Filed: Feb. 10, 1971

[21] Appl. No.: 114,359

Related U.S. Application Data

[63] Continuation of Ser. No. 741,691, July 1, 1968, abandoned.

[52] U.S. Cl. .................. 161/167, 161/194, 117/76, 40/125 A
[51] Int. Cl. ............................................. C09j 7/02
[58] Field of Search ........................... 161/167, 94; 117/76 A, 72; 40/125 A

[56] References Cited

UNITED STATES PATENTS

| | | | |
|---|---|---|---|
| 1,901,094 | 3/1933 | Gabosch | 161/167 |
| 1,953,901 | 4/1934 | Ziegler | 161/167 |
| 2,753,284 | 7/1956 | Pahl et al. | 161/167 |
| 2,978,372 | 4/1961 | Bergstedt et al. | 161/36 |
| 3,423,276 | 1/1969 | Eckenroth | 161/167 |
| 3,475,260 | 10/1969 | Stokes | 161/167 |
| 3,515,270 | 6/1970 | Tonn et al. | 161/167 |

*Primary Examiner*—Morris Sussman
*Attorney*—Wolf, Greenfield & Sacks

[57] ABSTRACT

A laminated structure having a surface to which objects adhere upon application to the surface of the lamination and which objects may be removed from the surface and readhered thereto repeatedly over a long period of time. The lamination comprises an adhesively coated supporting member, a material impregnated with a pressure sensitive plastic adhesive, the material having open interstices in which the plastic adhesive is retained overlying and secured to the adhesively coated supporting member and a plastic adhesive film on the exposed surface of the underlying impregnated material. The film is believed to inhibit curing of the impregnant, and the plastic impregnant maintained in a substantially uncured flowable condition. Upon the application of an object to the surface film it is believed that the pressure exerted causes the film to be interrupted and an amount of the uncured plastic impregnant to flow to the surface of the film, thereby providing a surface to which the object may be removably adhered. The surface of the lamination is capable of being washed with soap and water to remove accumulations of dust, dirt or other material which pressure sensitive adhesive coatings normally attract. Such washings maintain both the appearance and the functional adhesiveness of the laminate over a very long period of time.

8 Claims, 4 Drawing Figures

Patented May 22, 1973 3,734,816

Inventor:
Joyce A. Swasey,
by Robert R. Churchill
Attorney

LAMINATED STRUCTURE HAVING A RENEWABLE TACKY SURFACE

RELATED APPLICATIONS

This application is a continuation of U.S. Pat. application Ser. No. 741,691 filed July 1, 1968 and now abandoned.

BACKGROUND OF THE INVENTION

The invention relates to a laminated structure having a surface to which objects may be removably adhered, i.e., adhered or removed many times without destroying the renewable adhesive quality of the structure.

DESCRIPTION OF THE PRIOR ART

In the conventional materials having adhesively coated surfaces of which I am aware, none are capable of providing a surface wherein the material itself may be repeatedly adhered and removed from an object or, conversely, objects repeatedly adhered to and removed therefrom over a long period of time and wherein the surface may be cleaned without destroying the renewable adhesive characteristic of the structure.

SUMMARY OF THE INVENTION

The invention relates generally to a laminated structure having a normally low-tack surface to which objects may be repeatedly removably adhered. The laminated structure embodies a reservoir of uncured flowable plastic impregnated in a fabric or other material having open interstices. The plastic is believed to be maintained in its substantially uncured state by the provision of an impermeable plastic film overlying and bonded to the impregnated fabric. Upon the application of an object to the surface of the laminate it is believed that a quantity of the uncured plastic flows to the surface of the laminate through the impermeable film believed to be interrupted by the pressure of the object against the laminate, thus rendering the surface adhesive. Objects thus applied to the surface of the laminate will thereby readily adhere thereto. Objects may be adhered to and then removed from the surface of the laminate many many times without removing any substantial amount of plastic from the surface of the structure whereby useful life of the lamination extends over a long period of time.

The invention has for a principal object to provide a laminate having a surface which normally remains in a low-tack state which surface may be readily washed and which becomes adhesive or tacky each time an object is applied thereto.

A further object of the invention is to provide a structure particularly adapted for use as a display board to which objects may be removably adhered and where useful life extends over a long period of time.

A still further object is to provide a laminate having a reservoir of substantially uncured plastic, i.e., pressure sensitive adhesive, which is non-toxic and non-flammable, which is capable of renewing the adhesive characteristic of the surface of the structure when objects are pressed against it or it is pressed against an object to thereby provide a surface which objects may be repeatedly adhered and/or removed over a long period of time.

With these general objects in view and such others as may hereinafter appear, the invention consists in the laminated structure as herein described and particularly claimed at the end of this specification.

DESCRIPTION OF THE DRAWINGS

In the drawings illustrating the preferred embodiment of the invention.

DESCRIPTION OF THE PREFERRED EMBODIMENTS

Figure 1:
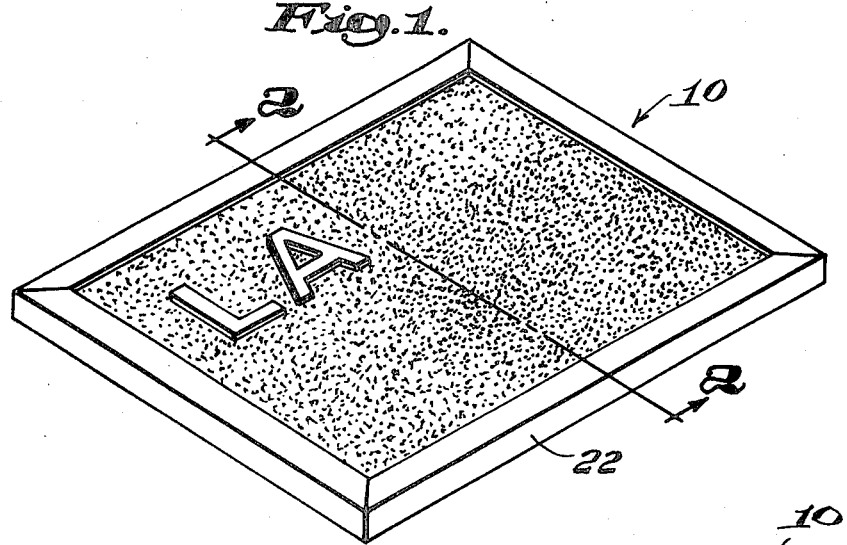
FIG. 1 is a perspective view of the laminated structure.

Referring now to the drawings, the laminated structure 10, as illustrated in FIGS. 1 through 4, comprises a base or supporting member 12 which in one form of the invention is a relatively rigid masonite board having a relatively smooth surface to which a pressure sensitive plastic adhesive material 14 is applied and adhered. A fabric 16 having an irregular surface is impregnated with an uncured plastic adhesive 18 compatible with the plastic 14 and the plastic impregnated fabric is applied to and bonded to the supporting member, the two plastic materials adhering to one another and the plastic 14 to the supporting member 12. One or more layers of a similar compatible plastic 20 are then applied to the exposed surface of the impregnated fabric and form an impermeable film over the impregnated fabric layer of the laminate to thereby provide a reservoir of uncured plastic by sealing the plastic from the atmosphere.

As a result it is believed that the plastic impregnant remains in a substantially uncured or flowable state providing a reservoir of flowable plastic for the purpose hereinafter to be described.

An important feature of the present invention resides in the fact that the uncured plastic is mechanically retained or stored in its uncured state within the interstices of the material in which it is impregnated. Thus, a reservoir of flowable plastic is provided to be used upon rupturing of the impermeable surface film by the application of pressure against the film.

Figure 2:
FIG. 2 is a cross section taken on the line 2—2 of FIG. 1.
Figure 3:
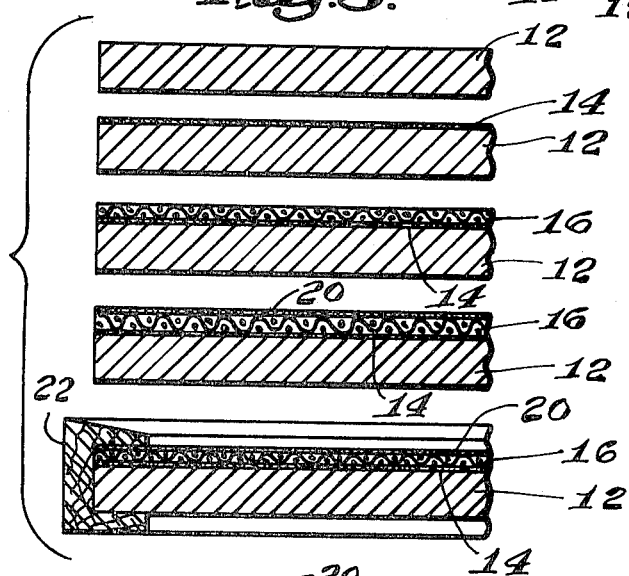
FIG. 3 is an exploded cross section of the elements comprising the laminate of the invention.
Figure 4:
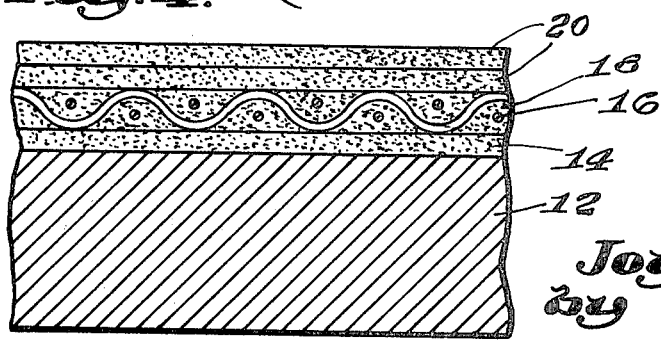
FIG. 4 is an enlarged cross section of a portion of the laminate.

In one form of the invention, as shown particularly in FIGS. 1 and 2, the laminated structure is useful as a display board to which letters or other designs may be detachably applied. In this form of the invention the board may be mounted in a frame 22 and the structure is particularly useful as a bulletin board in the home or industry, as a display board in stores, advertising and particularly useful as a child's toy or educational medium.

While the laminated structure has been illustrated as mounted in a frame, it will be understood that the frame is not necessary, and the finished laminate may be equally as useful without it.

In accordance with the present invention the present novel laminated structure provides a lamination having a surface which is normally impermeable and substantially non-tacky which may be gently washed when dusty or dirty with ordinary soap and water and dried without destroying its operativeness.

While in the preferred form of the invention the supporting member 12 is described as comprising a masonite board, it will be understood that other materials having a relatively smooth surface to which the plastic adhesive is capable of being bonded may be used, such as fiber board, other natural, synthetic or metal sheet materials.

For the purpose of illustration and not by way of limitation, the particular pressure sensitive plastics used in accordance with the present invention may comprise a plastic material known and commercially available as "St. Bernard Emulsion"V-9175, which is an acrylic-/acetate copolymer manufactured and sold commercially by the H. B. Fuller Company, of 4819 Industrial Court, St. Bernard 17, Cincinnati, Ohio, and/or a polyvinyl acetate-acrylate resin also manufactured by the Fuller Company and referred to as "Fuller's No. W-3950." It will be understood that other pressure sensitive adhesives may be used. The plastics above mentioned provide a relatively soft film, and any other pressure sensitive plastics used should be of the type which produce this type of film. Polyvinyl acetate may be used to coat the supporting member, but since it produces a hard film, it is not preferred.

In accordance with the invention, the impregnated material used in the formation of the laminate may be woven or non-woven, natural or synthetic, or any combination thereof, the requirement being that the material contain interstices into which the plastic impregnant may flow and be mechanically retained until it is caused to flow through the ruptured surface of the impermeable coating film and that the surface of the material be irregular, the irregularities being capable of assisting to interrupt the surface film upon the application of pressure thereto.

In practice the present laminate may be produced by first applying a coating of the pressure sensitive plastic adhesive of the type hereintofore described to the support member. It may be applied in any convenient manner, such as by brushing, spraying, or rolling. The thickness of the adhesive is not critical. However, the surface of the supporting member should be evenly covered. The fabric is then pressed evenly on the adhesive coated supporting member and impregnated with either the same or a compatible uncured pressure sensitive plastic adhesive, heretofore described, so that a substantial portion of the plastic flows into and is retained in the interstices of the fabric. While the plastic impregnated in the sheet is still substantially uncured, one or more layers of a similar or the same kind of pressure sensitive plastic adhesive is brushed, sprayed or rolled on the exposed surface of the fabric layer. As a result of its exposure to the atmosphere, the surface layer of adhesive dries or is substantially cured, thus forming a thin film over the underlying fabric plastic layer. The laminate is bonded together by pressure applied thereto in any convenient manner and an even relatively smooth surface provided The laminate produced in the manner hereintofore described has a surface which is impermeable and normally remains in a low-tack state and becomes adhesive enough to retain an object such as, for example, a preformed letter of the alphabet when it is pressed onto the surface. The object or objects may be readily removed by merely picking them off of the surface. In practice when an object is removed from the surface of the laminate no observable amount of the plastic adhesive is removed. This is believed due to the fact that that area of the plastic which adheres to the object is elastically restrained by the impregnated material layer and has more affinity to the underlying plastic than to the object being removed. Without the intermediate flexible matrix portion of the laminate, removal of adhered objects will usually remove substantial segments of the adhesive layer. Instead of applying an object to the surface, the laminate itself may be adhered to the surface, such as a wall or other substance.

Perhaps the most important advantage of the present invention over the prior art resides in the fact that the surface is renewable, i.e., it retains its ability to become, when used, tacky or adhesive even after extended periods of use, and that it may be easily cleaned without diminishing its operativeness.

In another form of the invention the supporting member may comprise a thin flexible sheet material, such as paper or thin flexible plastic sheets.

The flexible supporting member is coated with a plastic material of the type hereintofore described and a thin lightweight matrix material, such as nylon net, impregnated with a compatible plastic is applied to and bonded to the supporting member. As hereintofore described, the surface of the impregnated material is coated with one or more layers of the plastic material which forms a substantially impermeable film. A pattern, such as a dress pattern, design or drawing of some kind, may be printed upon the surface of the supporting member or the nylon material. Whenever it is desired to use the pattern, for example, to cut out a dress, the plastic coated surface of the laminated structure may be pressed against the smoothed-out surface of the fabric form which the pattern pieces are to be cut and thereby firmly held in place, and it is easily removed therefrom when it is desired to do so. This greatly facilitates the use of the pattern since it is placed and held in a fixed position without the usual pins. Difficulty is frequently encountered in using conventional clothing pattern materials since they are so light and flimsy they are easily disturbed by air currents. The invention has a further advantage in that the lamination may be folded upon itself and stored, packaged or rolled and readily spread out for repeated use without destroying any of the adhesive characteristics thereof.

The present invention has many diversified uses, such as to provide reclosable packages, pressure sensitive closures for clothing wherein strength is not the primary consideration, and for many other items wherein reusability, long life, and adhesiveness with a normally low-tack characteristic (but where degree of tack increases with pressure applied) are essential. The laminate may also be used to hold lightweight structural members together such as blocks, puzzle pieces and the like.

While the present invention has been illustrated and described as providing plastic-fabric layers on one side of a supporting member, it will be understood that such layers may be provided on both sides of the supporting member or on portions only of one or both sides thereof. By providing the plastic-fabric layers on both sides of the supporting member, the laminate may be removably adhered to a wall and objects adhered to the opposite surface, the objects easily removed and replaced, or the entire laminate removed and replaced wherever desired.

While the preferred embodiment of the invention has been heretofore illustrated and described, it will be understood that the invention may be embodied in other forms within the scope of the following claims.

Having thus described the invention, what is claimed is:

1. A laminated display board for use in removably adhering objects for educational, amusement and other purposes, said display board comprising, a supporting backer board means for providing a backing of said display board, a permeable sheet means overlying and bonded to said supporting backer board means with said permeable sheet means defining reservoir means in the form of interstices, said permeable sheet means having said reservoir means carrying a highly tacky pressure sensitive adhesive, and a pressure sensitive low tack, continuous, water washable film means of an adhesive overlying said permeable sheet means for providing a surface of said display board, said film means being rupturable when pressure is applied to said surface and against said permeable sheet means to cause said first-mentioned tacky adhesive to be exposed to said surface whereby a renewable tacky surface of said display board is provided.

2. A laminated display board in accordance with claim 1 wherein said first-mentioned tacky adhesive is an uncured plastic adhesive and said permeable sheet means comprises a plurality of fibers defining interstices therebetween.

3. A laminated display board in accordance with claim 2 wherein said film is impermeable so as to act to inhibit curing of the underlying uncured plastic adhesive and said sheet means is a textile material.

4. A laminated display board in accordance with claim 3 wherein said film is formed of said tacky uncured plastic adhesive in its dried form whereby said surface is in a low tack state until pressure actuated to rupture said film.

5. A laminated display board in accordance with claim 4 wherein a rigid frame surrounds the marginal edges of said laminated structure and said backer board is rigid.

6. A laminated display board in accordance with claim 4 wherein said tacky adhesive is in an uncured form and said film adhesive is in a dried form of the same material.

7. A laminated display board in accordance with claim 3 wherein said film is water cleanable and renewable over long time periods and said highly tacky adhesive is a pressure sensitive polyvinyl adhesive.

8. A laminated display board in accordance with claim 2 wherein said adhesives are selected from the group consisting of polyvinyl acetate acrylic copolymer and polyvinyl acetate homopolymer.

* * * * *